United States Patent [19]

Hanchett, Jr.

[11] 3,902,049

[45] Aug. 26, 1975

[54] BINARY BAR CODE READER CAPABLE OF READING SKEWED LINES

[75] Inventor: Leland J. Hanchett, Jr., Winchester, Mass.

[73] Assignee: Taplin Business Machines Incorporated, Burlington, Mass.

[22] Filed: Feb. 25, 1974

[21] Appl. No.: 445,191

[52] U.S. Cl. .......... 235/61.11 E

[51] Int. Cl.$^2$ .......... G06K 7/00

[58] Field of Search .......... 235/61.11 D, 61.11 E, 61.11 F; 340/146.3 H; 360/63

[56] References Cited

UNITED STATES PATENTS

| | | | |
|---|---|---|---|
| 3,801,775 | 4/1974 | Acker | 235/61.11 E |
| 3,821,520 | 6/1974 | Ladine | 235/61.11 E |

*Primary Examiner*—Vincent P. Canney
*Attorney, Agent, or Firm*—Erwin Salzer

[57] ABSTRACT

An opto-electronic reader adapted to read skewed-lines characterized by a large signal to noise ratio. A relatively long linear array of photosensors is subdivided into two groups or windows. The first group of photosensors or window reads lines which are relatively advanced in the direction of the movement of the paper, and the second group of photosensors or window reads lines which are trailing in the direction of the movement of the paper. The scan is effected helically substantially at right angles to the direction of movement of the paper. The outputs of said first window and said second window are processed in separate channels. A window selector allows to supply the general recognition logic of the reader selectively with the output of either of the two signal processing channels. The window selector is under the control of logic circuitry which determines whether the general recognition logic is to be supplied with the processed output of the first window, or with the processed output of the second window. Normally the first window is on, i.e. the general recognition logic of the reader is normally supplied with the processed output of the first window. If during a given scan there is a predetermined number of successive valid character signals in the aforementioned first channel, and if there is simultaneously a valid character signal in the second channel, the window selector connects the second channel to the general recognition logic of the reader. Each channel includes individual pre-amplifiers for the outputs of the individual photosensors which pertain to each of the two windows, groups of summing amplifiers, groups of diodes, quantizers and a delay line. The window selector is under the control of a valid code set recognition logic which, in turn, is under the control of a detector capable of detecting the presence of a predetermined number of valid characters within a given scan. This detector is supplied from the general recognition logic with valid character signals which are counted by a counter.

8 Claims, 10 Drawing Figures

BINARY BAR CODE READER CAPABLE OF READING SKEWED LINES

BACKGROUND OF THE INVENTION

It frequently occurs that optical bar code readers are called upon to read lines which are accidentally typed or printed in such a fashion as to be skewed with respect to the edge of the paper on which they are printed, or with respect to each other. Some means must, therefore, be provided in optical bar code readers for reading skewed lines or, in other words, for compensating for the presence of skew. The problem is still more complex when an optical reader is required to read bar coded information on lines appearing below, or above, lines formed by alphanumeric characters. In that instance the bar code reader is called upon to distinguish between alphanumeric characters, or electric analog error signals which result from accidental reading of such characters, and to correctly interpret the readings resulting from skewed lines.

The present invention relates primarily to means for properly reading skewed lines and also to means for discriminating between signals which result from the accidental reading of parts of alphanumeric characters. The latter means are a further development of the circuitry described in detail in my copending patent application filed 09/17/73 Ser. No. 398,035 for BAR CODE PROCESSING AND DETECTING SYSTEM.

SUMMARY OF THE INVENTION

It is possible to read lines of bar code printed matter even if skewed, provided that the length of the linear array of photosensors is increased to such an extent as to be able to cover a "worst case" skewed lines situation. Such an extendion of the length of the linear array of photosensors, or the length of the reading window results, however, in an unfavorable, or small, signal to noise ratio output.

The present invention is predicated on the concept of providing a linear array or window of considerable length and of sub-dividing the same into two overlapping sections of which each is used only as needed. A logic circuitry and a change-over switch determine which of the two sections of the long window is needed.

In optical bar code readers the scanning lines are helical lines across the page. A linear array used in a reader embodying this invention has a window height which is a relatively large multiple of the screw pitch, while the height of each of the overlapping sections of the window is a relatively small multiple of the screw pitch. To be more specific, the total height of the window may be 8 to 9 times the screw pitch, and the height of one of two overlapping sections of the window may be 5 times the screw pitch. It is apparent from the above that in a configuration of the contemplated kind each line may be scanned several times.

It will be apparent from the above that the travel of the paper bearing the bar-coded matter to be read per scanning line is considerably less than the height of the window and may be in the order of one-fifth of its height.

A bar code reader embodying this invention includes in addition to the sectionalized linear array of photosensors a first channel carrying signals being a combination of the output of a first portion or section of the constituent photosensors of said array and a second channel carrying signals being the output of a second portion or section of the constituent photosensors of said array. A bar code reader embodying this invention further includes a dual state change-over selector switch means having a first input derived from said first channel and having a second input derived from said second channel and having an output derived selectively from said first output and said second input thereof. Said change-over selector switch means are controlled by a logic circuitry including means for detecting in said first channel the presence of a predetermined number of valid bar characters within a predetermined time frame, and said logic circuitry further including valid code set recognition means.

DESCRIPTION OF PREFERRED EMBODIMENT

Figure 1:
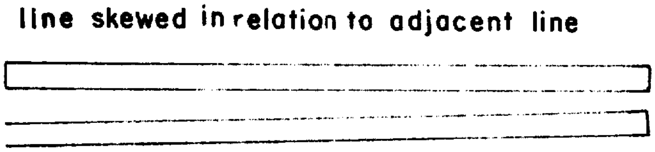
FIG. 1 and FIG. 2 are diagrammatic representations of the type of skewed lines which an optical bar code reader may be required to read.
Figure 2:
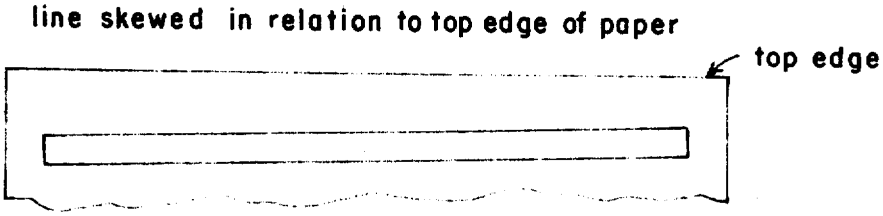

FIGS. 1 and 2 show two typical cases of skewed lines which may cause trouble in bar code readers. The rectangles in FIGS. 1 and 2 are supposed to be bar coded lines. The presence of lines made up of alphanumeric characters has been disregarded in drawing FIGS. 1 and 2. FIG. 1 shows two lines of which each is formed by bar coded characters. The upper line is parallel to the top edge of the paper on which it is written, but the lower line is not parallel to the upper line. FIG. 2 shows diagrammatically a single line of bar coded characters. This line is skewed in relation to the upper edge of the paper.

Figure 3:
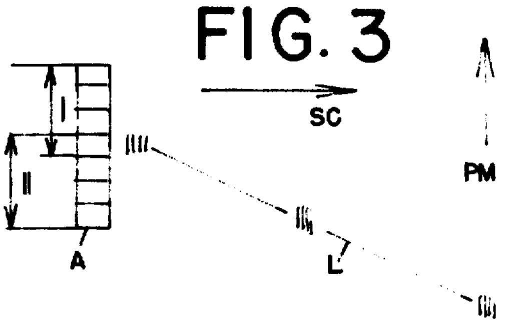
FIG. 3 and FIG. 4 illustrate the relation of a linear array of photosensors and of a skewed line of bar coded characters at two different points of time, i.e. for two different scans.

FIG. 3 shows a linear array including seven photosensors. This array is sub-divided in two sections or portions which may be also referred to as windows. Reference character I has been applied to indicate the four photosensors or photodiodes which form the upper section or window, and reference character II has been applied to indicate the four photosensors or photodiodes which form the lower section or window. Reference character L has been applied to indicate a skewed line of bar coded characters. Arrow SC indicates the direction of the scan, and arrow PM indicates the direction of the movement of the paper on which bar coded line L and other lines are printed. Optical reading is preferably effected with an opto electrical reader of the kind described in the copending patent application of John F. Taplin, filed 06/01/73; Ser. No. 365,878 for ELECTRO-OPTICAL READER.

Figure 4:
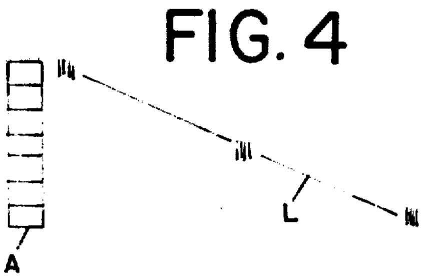

Before the paper on which line L is printed has reached the position shown in FIG. 3, none of the photosensors of window I of array A will see any bar code symbol. The scans preceding this position are not considered to be valid scans. In the position of the paper shown in FIG. 3 the first bar coded character of line L will be recognized by the lowermost photosensor of window I of array A. FIG. 4 shows the relative position of array A and line L after the paper has moved in the direction of the arrow PM a certain distance, and several scans have been effected, say 4 scans. These four scans will include the optimum location of a line of characters for scanning by two channels of which each processes the output of one of the above referred-to windows I and II.

The output of window I is processed in a first channel and the output of window II is processed in a second channel. These two channels have been illustrated in form of block diagrams in FIG. 5. The output of each photosensor forming part of window I and the output of each photosensor forming part of window II is amplified in an individual pre-amplifier which results in a number of analog signals which is equal to the number of photosensors of which array A is made up. The amplified four outputs of window I derived from the upper pre-amplifiers PA are combined in three summing amplifiers SA, and the four amplified outputs of window II derived from the lower set of pre-amplifiers PA are combined in three summing amplifiers SA. The sums resulting from the combination of the amplified outputs of the photosensors of window I are rectified by diodes D and quantized by quantizers Q and the same applies to the amplified outputs of the photosensors of window II which are processed in a channel which is separate from the channel in which the amplified outputs of the photosensors of upper window I are processed.

The circuitry diagrammatically shown by blocks PA,SA and D,Q is described in considerable detail in the copending patent application of Leland J. Hanchett, Jr., filed 09/17/73; Ser. No. 398,035 for BAR CODE PROCESSING AND DETECTING SYSTEM, and this circuitry (except for its quantizing means) will be described below in more detail in connection with FIG. 6.

Figure 5:
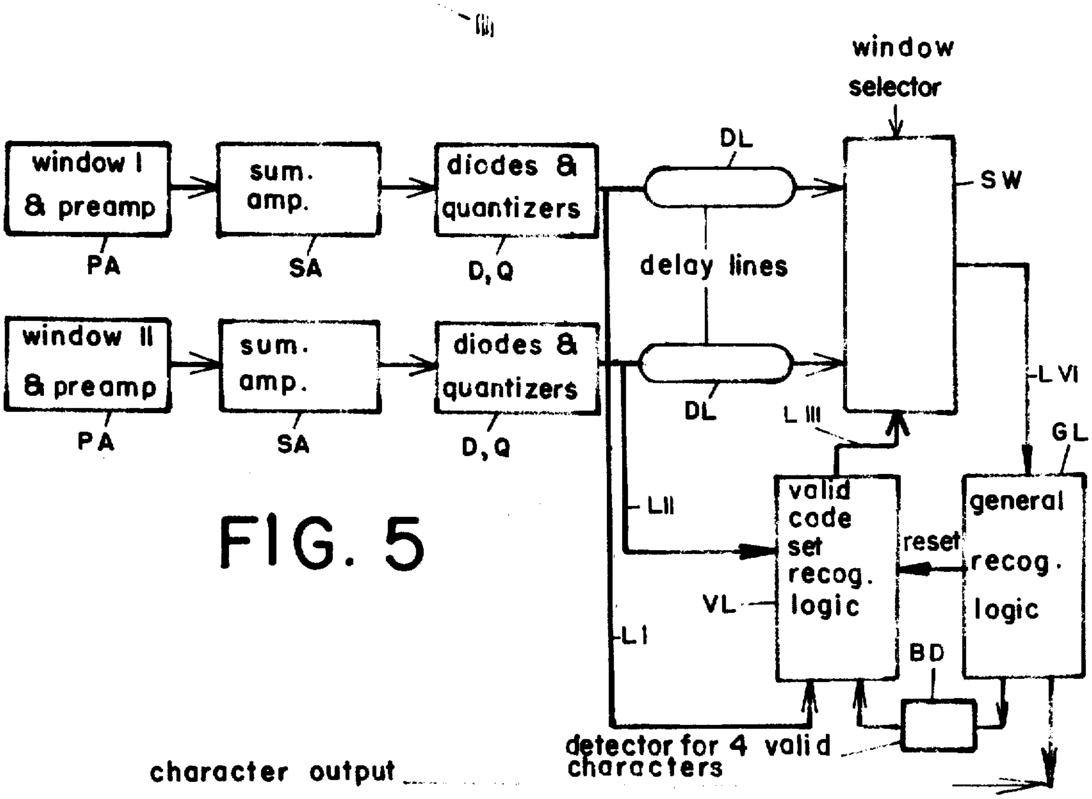
FIG. 5 is a block diagram of a system embodying this invention.

Reference character DL has been applied in FIG. 5 to indicate a pair of delay lines formed by shift registers for the quantized information supplied by the diode and quantizer units D,Q. Delay lines DL are connected to a dual state change-over selector switch SW having a first input derived from upper or first channel PA,SA, D,Q and DL and having a second input derived from lower or second channel PA,SA,D,Q and DL. The output of selector switch or window selector SW is derived selectively either from said first channel or from said second channel. The selector switch or window selector SW is under the control of logic circuitry including the general recognition logic GL, a detector circuitry BD for detecting the presence of a predetermined number of valid bar characters in the channel of window I within a predetermined time frame, and the valid code set recognition unit VL.

The above units and their operation will first be described in general terms, i.e. irrespective of the nature of the particular bar code which they are intended to process. Subsequently these units will be described in more detail in a specific form thereof intended to process a specific bar code.

The general recognition logic GL receives delayed input signals from window selector SW which may be derived either from the channel of window I, or from the channel of window II, depending upon the state window selector SW is in. The character output of the general recognition logic GL is supplied to the subsequent stages of the system not shown in FIG. 5. For the purposes of this invention the general recognition logic GL may be endowed to perform any desired function or functions, but it must be able to transmit valid character signals to the detector BD which has the function to determine whether or not a predetermined number of successive valid character signals have been received within a given line by the general recognition logic GL from window I by way of the upper of the two processing channels. Whenever unit BD detects the presence of a predetermined number of successive valid characters within a given scan, e.g. four such characters, it activates the valid code set recognition logic VL. If the valid code set recognition logic VL recognizes the presence of a valid code set following a signal from unit BD indicating that a predetermined number of successive valid characters within a given scan have been detected by it, the state of window selector SW is changed by a signal emanating from unit VL. As a result of such a signal the channel processing the output of window I is de-activated and the channel processing the output of window II is activated. In other words, the system has an initial flow path beginning at window I to the general recognition logic GL and a second flow or alternate path beginning at window II to the general recognition logic GL.

It will be apparent from the above window I and the subsequent stages of the first channel form a line finder or a presence of a line sensor, and that window II and the subsequent stages of the second channel form the actual reading channel. The determination of which window I or II and which channel should be active is based on the following:

a. Has a valid scan started? The test is whether or not a predetermined number, e.g. four, adjacent error free characters have been read.

b. Has a valid bar code set been identified by the lower window or window II.

In short, window I and the upper channel is on normally and the window and the lower channel comes on only if a valid character is identified. Under no conditions can windows I and II and both channels be on.

The above may also be expressed in form of a truth table wherein X means window I and the first channel is on, and O means window II and the second channel is on.

| | valid character detected by character recognition logic *VL* | no valid character detected by character recognition logic *VL* |
|---|---|---|
| line presence test passed (valid scan) → | O | X |
| line presence test not passed (not valid scan) → | X | X |

The above truth table may be rewritten as follows:

| | $B$ | $\bar{B}$ |
|---|---|---|
| $A$ | O | X |
| $\bar{A}$ | X | X |

In this truth table X and O have the same meaning as stated above and refer to the two possible states of the change-over selector switch means or channel selector SW. A means that a detector for detecting a predetermined number of successive valid characters in a given scan — unit BD of FIG. 5 shown in detail in FIG. 9, where reference characters VCCN, LPFF and SC have been applied to its constituent parts — has been detected. A is absence of that predetermined number of successive valid characters, e.g. four such characters within a given scan. A means not A. As a result of A a line presence signal is transmitted from unit BD to unit VL or, to be more specific, from the line presence flip-flop LPFF of FIG. 9 to the valid code recognition logic VL of FIG. 5. In the above truth table B means that the additional character recognition circuitry or valid code set recognition logic VT has determined the presence of a valid character in window II and the channel PA,-SA,D,Q to which that window is connected.

The above truth table shows that this invention is not limited to a specific bar code and a specific logic adapted to read that bar code, but is generally applicable irrespective of the particular bar code and the particular logic adapted to read the same and to detect errors in it. Considering a bar code wherein each character is formed by four bars and three intervening spaces, as more fully disclosed in the patent application of John F. Taplin, filed 06/23/72; Ser. No. 265,637 for BINARY BAR CODE PRINTING DEVICE AND BAR CODE PRINTED MATTER and filed 12/05/73; Ser. No. 421,872 for TYPES AND TYPE SETS FOR PRINTING DEVICES, the general recognition logic circuitry VL of FIG. 5 may be formed by the circuitry disclosed in the copending patent application of Leland J. Hanchett, Jr. filed 09/17/73; Ser. No. 398,135 for BAR GEOMETRY VERIFICATION SYSTEM FOR BAR CODED CHARACTERS.

Figure 6:
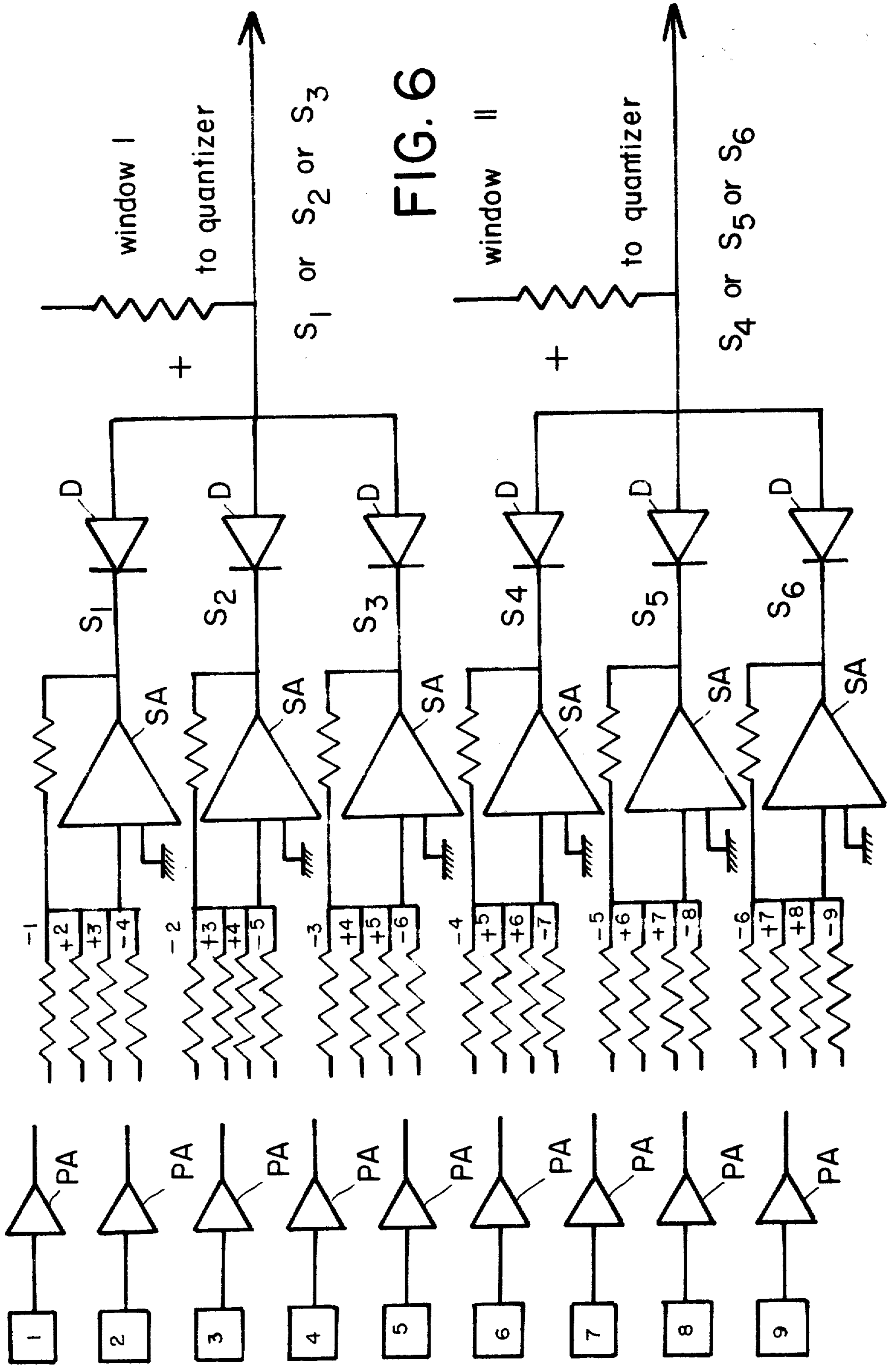
FIG. 6 is a simplified circuit diagram showing the input end of a system embodying this invention.

Referring now to FIG. 6, this figure shows to the left thereof a linear array including nine photosensors to which reference characters 1 to 9 have been applied. For convenience of illustration the photosensors 1 to 9 have been shown as being spaced. Actually photosensors 1 to 9 are not spaced but arranged immediately adjacent to each other in the same way as shown in FIG. 3 and in FIG. 4. The photosensors 1 to 6, inclusive, form a first window for one of two processing channels, and the photosensors 4 to 9, inclusive, form a second window for another of said two processing channels. Each photosensor 1 to 9 is connected to an individual pre-amplified PA which amplifies the output of the former. Reference characters SA have been applied to indicate six summing amplifiers. The outputs of these six summing amplifiers may be expressed by the following six equations wherein the symbols $S_1$ to $S_6$ indicate the outputs of the aforementioned six summing amplifiers SA, and wherein the symbols $C_1$ to $C_9$ indicate the amplified outputs of photosensors 1 to 9 or, in other words, nine quantities linearily proportional to the outputs of the nine photosensors 1 to 9.

$$S_1 = C_2 + C_3 - (C_1 + C_4) \quad (1)$$
$$S_2 = C_3 + C_4 - (C_2 + C_5) \quad (2)$$
$$S_3 = C_4 + C_5 - (C_3 + C_6) \quad (3)$$
$$S_4 = C_5 + C_6 - (C_4 + C_7) \quad (4)$$
$$S_5 = C_6 + C_7 - (C_5 + C_8) \quad (5)$$
$$S_6 = C_7 + C_8 - (C_6 + C_9) \quad (6)$$

As shown in my aforementioned patent application Ser. No. 398,035 each summing amplifier SA may include two stages. In the first stage the sums $C_1+C_4;C_2+C_5;C_3+C_6$, etc. are formed and inverted and in the second stage these inverted sums are added algebraically to the sums $C_2+C_3;C_3+C_4;C_4+C_5$ etc. The outputs $S_1,S_2$ and $S_3$ are rectified by one group of three diodes D and the outputs $S_4,S_5$ and $S_6$ are rectified by another group of three diodes D.

In drawing FIG. 6 the amplified inverted outputs of photosensors 1,2,3, etc. have been indicated by a "—" symbol and the non-inverted amplified outputs of photosensors 2,3,4, etc. have been indicated by a "+" symbol. Thus the figures "—1,+2,+3,—4" appearing at the input circuit of the highest summing amplifier SA are an abbreviation of the term $C_2+C_3-(C_1+C_4)$. In other words, in FIG. 6 the amplified inverted output of photosensors 1 to 9 has been indicated by a minus sign followed by the number of the respective photosensor, and the amplified non-inverted output of photosensors 1 to 9 have been indicated by a plus sign followed by the number of the respective photosensor. As shown in detail in my patent application Ser. No. 398,035 the output of the three upper summing amplifiers SA will reach a maximum value only in the presence of a vertical bar of predetermined length. The aforementioned output will be less than said maximum value if the length of a bar is either less than said predetermined length, or exceeds said predetermined length. By using balanced matrices, i.e. matrices having equal positive and negative outputs in the presence of white background, the white background is cancelled out. By rectifying the outputs of the two groups of summing amplifiers of which each comprises three summing amplifiers SA by means of halve wave rectifiers D, the two outgoing lines marked "to quantizer" will carry only the most negative going signals which are either $S_1$ or $S_2$ or $S_3$ or $S_4$ or $S_5$ or $S_6$.

The output of an optical bar code reader may be referred to as an analog signal because it is in the form of a continuous voltage having relatively long rise times and decay times and is, therefore, not strictly in binary form. An analog signal of a bar coded character is subject to such variables as print consistency, illumination level, component tolerances, etc. The effects of these variables must be eliminated and the electric analog signals converted into strictly binary electric signals. This process is known as quantizing. The rectified analog signals $S_1$ or $S_2$ or $S_3$ — whichever is the largest — form the input of a first quantizer Q indicated in the block diagram of FIG. 5, and the rectified analog signals $S_4$ or $S_5$ or $S_6$ — whichever is the largest — form the input of a second quantizer indicated in the block diagram of FIG. 5. These quantizers may be of more or less conventional design, but are preferably of the design disclosed in my co-pending patent application Ser. No. 398,035.

FIG. 3 shows a linear array of 7 photosensors and FIG. 6 shows a linear array of 9 photosensors. These two figures have been chosen as examples, but the number $n$ of sensors of which each array A is made up may be a number other than seven and nine, provided that it is an odd number. Considering an array A of photosensors including $n$ photosensors having outputs $C_1,C_2,C_3 \ldots C_{n-2},C_{n-1},C_n$ in the order of the position thereof in a linear array. Then the first channel will include groups of summing amplifiers SA summing the outputs of photosensors $C_1$ to $C_{n+3/2}$
and the second channel will include groups of summing amplifiers SA summing the outputs of photosensors $C_{n-1/2}$ to $C_n$. The summing amplifiers in the first channel will produce $(n-3)/2$ sums as follows:

$$C_2+C_3-(C_1+C_4)$$

$$C_3+C_4-(C_2+C_5)$$

$$\vdots$$

$$\frac{C_{n-1}}{2}+\frac{C_{n+1}}{2}-\left(\frac{C_{n-3}}{2}+\frac{C_{n+3}}{2}\right).$$

The summing amplifiers SA in the second channel will produce $(n-3)/2$ sums as follows:

$$\frac{C_{n+1}}{2}+\frac{C_{n+3}}{2}-\left(\frac{C_{n-1}}{2}+\frac{C_{n+5}}{2}\right)$$

$$\frac{C_{n+3}}{2}+\frac{C_{n+5}}{2}-\left(\frac{C_{n+1}}{2}+\frac{C_{n+7}}{2}\right)$$

$$\vdots$$

$$C_{n-1}+C_{n-2}-(C_{n-3}+C_n)$$

It will be apparent from the above that these terms are but a generalization of the six equations which have been stated above and which are particularly applicable to the nine photosensor circuity of FIG. 6.

It is apparent from FIG. 5 that the valid code set recognition logic VL is supplied from both channels with undelayed quantized signals. The need for so doing will become more apparent from a consideration of the circuitry of FIG. 7. Reference character LI has been applied to FIG. 5 to indicate the line supplying signals to the unit VL which originate in window I and reference character LII has been applied in FIG. 5 to indicate the line supplying unit VL with signals which originate in window II. The same reference characters have been applied to the same lines in FIG. 7 which shows the valid code set recognition logic unit VL in more detail. The unit VL includes an OR-gate to which reference character OR has been applied having two inputs of which one is derived from line LI and the other is derived from line LII. The output of OR-gate, if any, initiates a character interval timer unit CI. As explained above neither the first channel nor the second channel of the circuitry of FIG. 6 yields an output as long as all sensors 1 to 9, inclusive, see white or, in other words, as long as both windows shown in FIGS. 3 to 5 see only the white of paper. At the first indication of black in either of the two windows or channels of FIG. 6 there is an input into OR-gate OR of FIG. 7 and consequently an output from that OR-gate. The output of that OR-gate initiates character interval timer CI and the output of the latter forms one of the inputs of a NAND-gate marked NAND I in FIG. 7. That gate has four inputs and one output line LIII. One input of gate NAND I is formed by the output of unit BG which is a bar geometry verification unit. Considering reading code printed matter as disclosed in the patent applications of John F. Taplin filed 02/23/72; Ser. No. 265,637 for BINARY BAR CODE PRINTING DEVICE AND BINARY BAR CODED PRINTED MATTER and Ser. No. 421,872 filed 12/05/73 for TYPES AND TYPE SETS FOR PRINTING DEVICES. As disclosed in these patent applications each character includes a predetermined number of bars and of interbar spaces, each bar having one of two different widths, and each inter-bar space having one of two different widths. The logic of unit BG is designed to detect instances where a bar is too narrow, or a bar is too wide. It may also detect whether the height of a bar as printed is too large, or too small. This processing of signals by unit BG is effected during character interval time which is the time elapsing between the first leading edge of the first bar of a bar-coded character and the trailing edge of the last bar thereof plus a fixed time (see FIG. 10). Delayed character interval time is determined by the general recognition logic GL of FIG. 5, and at the end of each delayed character a character output strobe signal is transmitted by way of line LIV from the general recognition logic GL to the character interval timer CI of the valid code set recognition logic VL resetting the former. The vaid code set recognition logic includes, in addition to the bar geometry verification unit BG, a bar count verification unit BCNT which determines whether the number of bars which ought to be present in a bar coded character is actually present in it. Both units BG and BCNT have an output if there is no error in regard to bar geometry and in regard to the number of bars which are present in a bar coded character. In other words, both logic units BG and BCNT have an output each forming an input for the NAND gate NAND I if both units BG and BCNT are supplied by window II and the channel processing the output of window II with electric signals which express a correct character. It will be understood that the logic circuitry of units BG and BCNT may vary depending upon the particular bar code to be read and processed. The AND-gate of FIG. 7 has a fourth input, namely a line presence signal referred-to above. This signal is obtained by the circuitry illustrated in FIG. 9 and described in the context thereof. As mentioned before, the line presence signal may be generated by the detector unit BD of FIG. 5 in case that a predetermined number — e.g. four — successive valid characters are present within a given scan.

Figure 7:
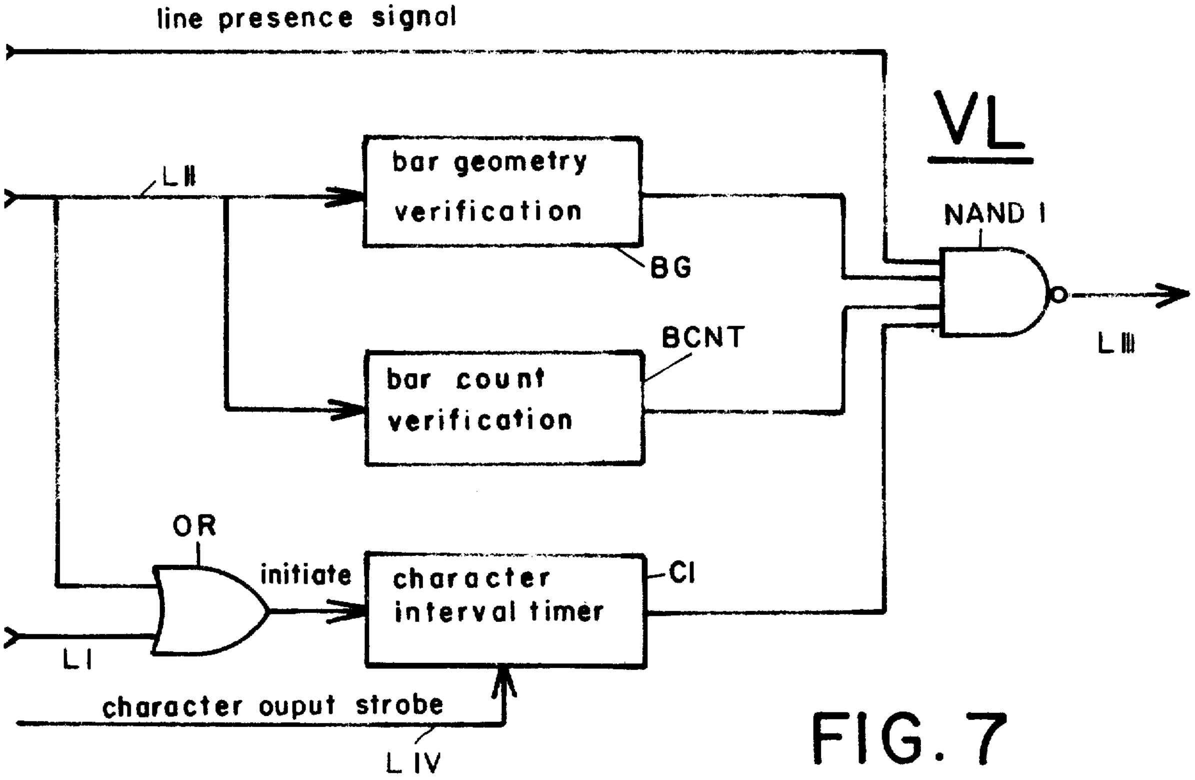
FIG. 7 is a block diagram showing in greater detail the valid code set recognition logic shown more generally in FIG. 5.

If there is a line presence signal and units BG,BCNT and CI have outputs which coincide in time, the output of NAND-gate of FIG. 7 goes low. The output of gate NAND I is transmitted via line LIII to the window selector SW shown in FIG. 5 and in more detail in FIG. 8. The signals carried by line LIII, i.e. the turn-on signals for the second channel are transmitted to the general recognition logic GL. At the end of a delayed character interval a character output strobe issues from the general recognition logic GL which is carried by line LIV to character interval timer CI, thus resetting the latter and disabling the NAND-gate NAND I.

Figure 8:
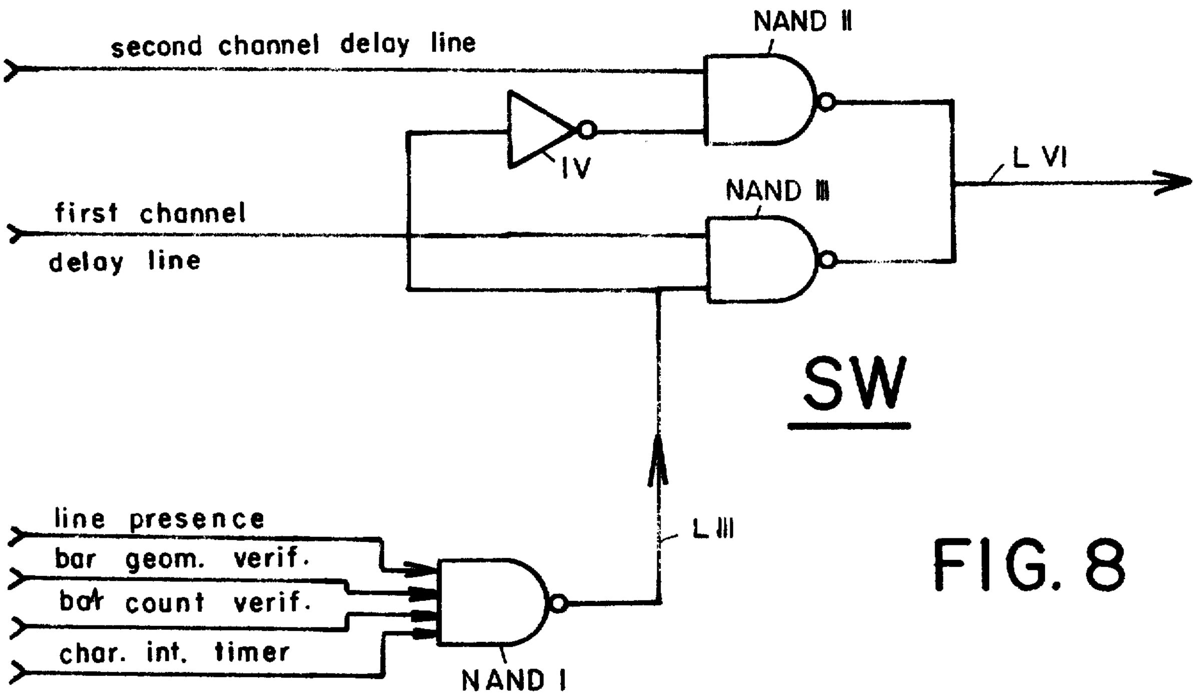
FIG. 8 is a circuit diagram showing in greater detail the window selector unit shown more generally in FIG. 5.

Referring now to FIG. 8, this figure shows the same NAND-gate NAND I as FIG. 7 with its four inputs line presence, bar geometry verification, bar code verification and character interval time. The window selector further includes two NAND-gates designated as NAND II AND NAND III and an inverter IV. NAND-gate II has two inputs of which one is derived from window II and the second channel including its delay line DL, and the other is the output of NAND-gate NAND I upon being inverted by inverter IV. The NAND-gate NAND III has two inputs of which one is derived from window I and the second channel including its delay line DL, and the other is the non-inverted output of NAND-gate NAND I. The line carrying the outputs of either of NAND-gates NAND II or NAND III to the general recognition logic has been designated in FIG. 8 by the reference character LVI.

It is apparent from FIG. 8 that the output of window I and its processing channel and its delay line D normally passes to the general recognition logic GL as long as NAND-gate NAND III is not turned off by NAND-gate NAND I. When the output of NAND-gate NAND I goes low the output of inverter IV goes high. It follows that whenever the four inputs of NAND-gate NAND I are all true, its output goes low and NAND-gate NAND III is turned off and NAND-gate NAND II turned on. NAND-gate NAND II is turned on for one single character interval time since at the expiration of that time the character interval timer CI is reset by a strobe signal coming from the general recognition logic GL.

Figures 9, 10:
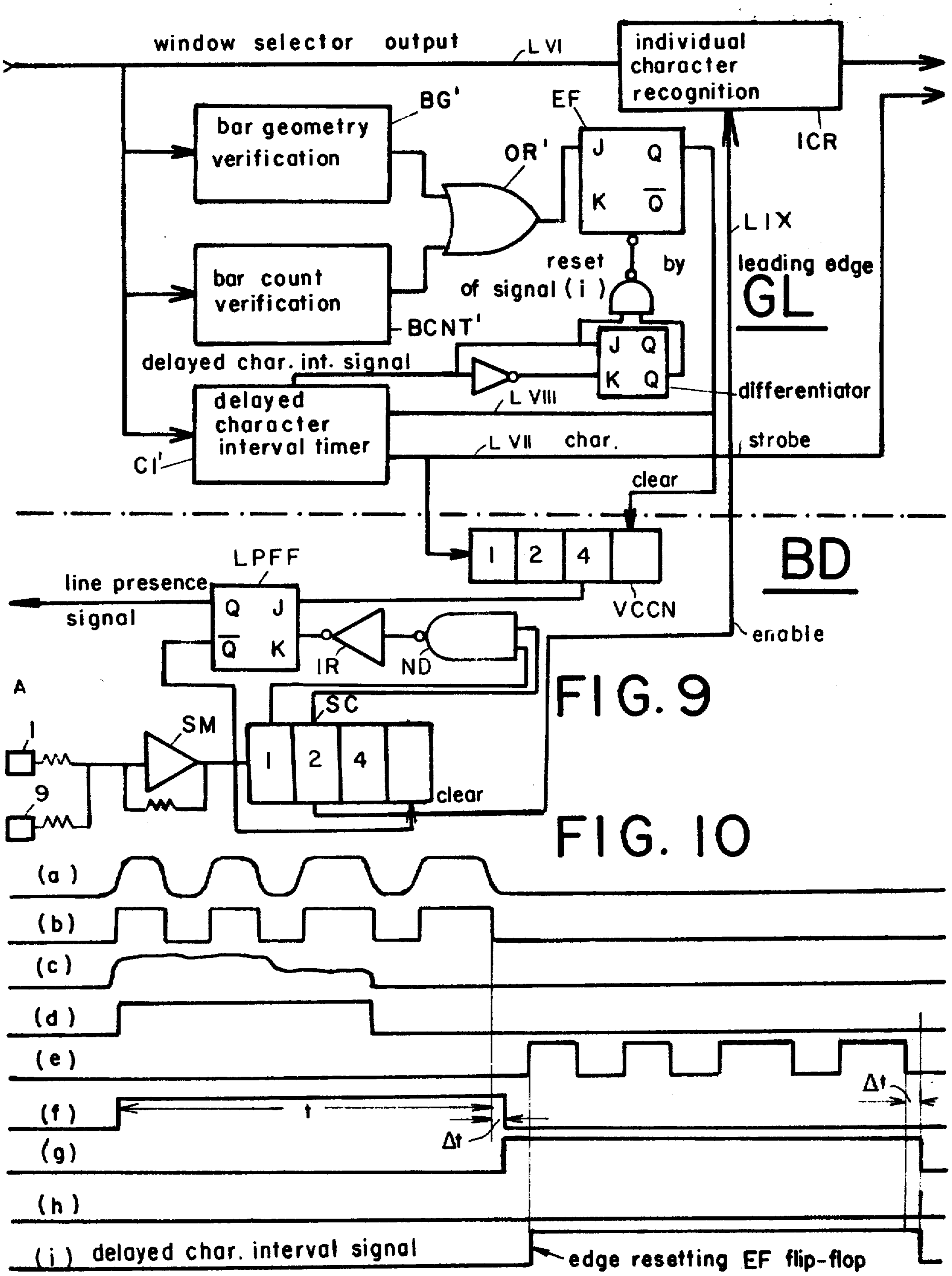
FIG. 9 is a block diagram showing in greater detail the general recognition logic unit and the detector for four valid characters shown more generally in FIG. 5.
FIG. 10 is a timing diagram illustrating a number of signals which may occur in the system of FIGS. 5 to 9, inclusive.

Referring now to FIG. 9, this figure shows in more detail the general recognition logic GL and the detector for a predetermined number of valid characters BD also, but more diagrammatically, shown in FIG. 5. A dash-and-dot line separates the parts pertaining to unit GL from the parts pertaining to unit BD. Reference characters LVI has been applied in FIGS. 5 and 9 to designate the line which carries selectively signals from either channel via the window selector SW to the general recognition logic unit GL. The general recognition logic includes a bar geometry verification unit BG′ and a bar count verification unit BCNT′. These units may be of the same nature as the units BG and BCNT shown in FIG. 7 and described in connection therewith. Various kinds of circuitry may be used for performing the verification functions required by units BC,BCNT,BC′ and BCNT′ of FIGS. 7 and 9. The logic of FIG. 9 further includes a delayed character interval timer CI′. The outputs of units BG′ and BCNT′ are supplied to the OR-gate OR′. Whenever one of the units BC′ or BCNT′ detects an error, a signal is transmitted to the OR-gate OR′. If there is an output at the OR-gate OR′, the error flip-flop EF is set and an error signal is transmitted from the error flip-flop EF to the timer unit CI′ by way of line LV III. Whenever an error signal is transmitted to the delayed character interval timer CI′ originating from error flip-flop EF, the delayed character interval timer is cleared and thus rendered inoperative. On the other hand, if the error flip-flop EF is not set by OR-gate OR′, and no error signal transmitted to delayed character interval timer CL′, the latter emits a valid character strobe signal propagated along line LVII.

In FIG. 9 reference character ICR has been applied to indicate an individual character recognition unit which translates or converts the series pulses received from window selector SW into parallel pulses which can be applied to read only memories for individual character classification.

As mentioned above, the line LWII carries signals which are indicative of the presence of a valid character or valid character strobe signals. These signals are supplied to the valid character counter VCCN which emits a signal to the valid code recognition logic and VL upon having counted a number of valid characters, e.g. four such characters. Counter VCCN is cleared by signals emanating from error flip-flop EF.

The lower portion of FIG. 9 shows also the circuitry for generating the line presence signal mentioned before in connection with the description of FIGS. 7 and 8 as forming one of the four inputs of NAND-gate NAND I. As shown at the left bottom region of FIG. 9 a sum is formed of the output of two cells of the array A, namely cells 1 and 9, by means of summing amplifier SM. The output of amplifier SM is a scan signal indicative of a scan being performed. The output of amplifier SM forms the input of scan counter SC which counts the number of scans. Reference character LPFF has been applied to indicate a JK flip-flop which may be referred-to as line presence flip-flop. The J terminal of line presence flip-flop LPFF is connected to the valid character counter VCCN so that flip-flop LPFF is set when the valid character counter VCCN has counted a predetermined number of valid characters, e.g. four valid characters. The K terminal of line presence flip-flop LPFF is connected to the scan counter SC so that the flip-flop will be reset upon a predetermined number of scans which, in the instant case, is three scans. It will be noted that the K terminal of line presence flip-flop LPFF is connected to the scan counter SC by the intermediary of NAND-gate ND and an inverter IR. The Q terminal of line presence flip-flop LPFF yields the line presence signal fed into the NAND-gate NAND I of the valid code recognition logic VL shown in FIG. 7. Scan counter SC is held reset in the absence of a line presence signal. Scans are counted only during a line present condition.

As stated above, the window selector SW supplies signals to the general recognition logic GL. Typically, these signals come from window I and the first channel PA,SA,D,Q,DL connected to window I. Each code set is processed through units BC′ and BCNT′. If the tests to which the signals are subjected in units BC′ and BCNT′ are passed, a valid character signal comes out of the delayed character interval timer CT′ and the valid character counter VCCN is advanced one count. Once in a given scan four successive valid characters are counted with no intervening error signals from error flip-flop EF, the line presence flip-flop LPFF is set. This flip-flop remains set until a predetermined number of scans counted by scan counter SC have occurred, e.g. three such scans, as indicated in FIG. 9.

During the time that the line presence flip-flop LPFF is set, the presence of a valid code set or character — as determined by the valid code set logic VL — allows the general recognition logic to be fed by window II and the channel which is associated with that window, or the second channel. This is, however, only for the duration of that particular code set. Each code set appearing in window II and the second channel must be validated by the valid code set logic VL before it is gated by the window selector SW into the general recognition logic GL.

As mentioned above the general recognition logic GL generates strobe out pulses for the character interval timer CI of the valid code set recognition logic VL. The way in which character output strobe pulses are generated depends upon the particular circuitry of the general recognition logic GL. Considering that the general recognition logic is designed to process bar coded characters as disclosed in the above referred-to patent applications of John F. Taplin and processed in the circuitry diagrammatically in FIGS. 5–9. When applying this circuitry, a valid character strobe signal is generated by detecting a trailing or falling edge of the delayed character interval timer CI′. This edge occurs when timer CI′ is reset on occurrence of the trailing edge of the last bar of a valid code set, or character.

(Speaking in terms of hardware rather than principle, a valid character strobe out signal may be generated by combining in an AND-gate or NAND-gate the character presence signal generated by the character presence flip-flop 14 of my patent application Ser. No. 406,518 with the signal supplied to the K terminal of said flip-flop).

Referring now to FIG. 10, line (a) thereof shows an analog signal resulting from reading a bar coded character including two relatively narrow bars and two relatively wide bars and three intervening spaces which are all of the same width. It may be assumed that the signal shown in line (a) results from the second window of FIG. 6 and is, therefore, one of the signals $S_4$ or $S_5$ or $S_6$ in the so-called second channel. Line (b) of FIG. 10 shows the same signal as shown in line (a) upon having been quantized. The signal shown in line (b) is the signal to be tested for its validity. Line (c) shows the analog input into the so-called first channel derived from the window I. Line (c) has been drawn on the assumption that window I does not read a valid bar coded character, or valid code set, but a mere black smudge appearing on the paper on which there is also bar coded information. The signal shown in line (c) results in the signal of line (d) upon having been quantized. Line (e) shows the same signal as line (b) upon having been delayed by the delay line DL forming part of the second channel PA,SA,D,Q,DL. The two signals shown in lines (b) and (d) form the input of the OR-gate OR shown in FIG. 7. The output of that OR-gate forms the input of the character interval timer CI of FIG. 7. Line (f) of FIG. 10 shows the output signal of the character interval timer CI. It will be apparent from line (f) that the duration of a character interval is equal to the time *t* of the train of pulses of line (b) plus on increment of time $\Delta t$. During the time elapsing in a character interval $t + \Delta t$ the valid code set recognition logic VL performs certain tests which have been specified above by way of example. If these tests are passed successfully by any signal the so-called second channel is to be turned on, and the so-called first channel turned off. Line (g) of FIG. 10 shows the signal by which this is achieved, i.e. the output signal of the inverter IV of FIG. 8. Line (h) of FIG. 10 shows the strobe out pulse generated by the general recognition logic GL at the end of one character interval. Line (i) of FIG. 10 shows the delayed character interval signal which is the output of the delayed character interval timer CI' forming part of the general recognition logic as shown in FIGS. 5 and 9.

It will be apparent from the above that properly printed or horizontal lines, i.e. lines which are not skewed in either direction, will be read only by window 1 and the resulting signal will only be processed by the summing amplifier, diodes, quantizers and delay line channel which is associated with window I. At the time the first character of a non-skewed line reaches the first photosensor of array A, all other characters of that line are out of the range of window II. Thus, in the instance of a non-skewed line the valid code set recognition logic unit VL is not supplied with any underlayed signal originating from window II. The signals resulting from reading of non-skewed lines are directly transmitted from window selector SW to the general recognition logic GL and processed by the individual character recognition unit ICR.

Window II and the summing amplifier, diodes, quantizers and delay line channel which is associated with that window becomes operative only if and when a line is skewed in either direction, i.e. either higher on one than on the other of its ends. If a printed line slopes down from left to right, as shown in FIGS. 3 and 4, after a predetermined number of valid characters at the left end of the line have appeared in both windows I and II, window selector SW will switch from the channel asssociated with window I to the channel associated with window II. On the other hand, if a printed line slopes down from right to left, after a predetermined number of valid characters at the right of the line have appeared in both windows I and II, window selector SW will switch from the channel associated with window I to the channel associated with window II. Since in good printing lines are preponderantly not skewed, the channel associated with window I will be on for a preponderant portion of the reading time, and the channel associated with window II will be switched on only occasionally. In drawing and describing FIGS. 7 and 9 it has been assumed that both the valid code set recognition logic unit VL and the general recognition logic unit GL are formed by sub-units, BG,BCNT, CI and BG',BCNT' and CI' which perform the same functions, as set forth above. This, however, does not need to be so. The general recognition logic GL must be capable of performing all the tests needed for the recognition of a character and for separating valid character signals from signals which do not represent valid characters. It is conceivable that the recognition logic VL is designed to perform more limited steps than the general recognition logic GL. In such a case the recognition logic VL may pass a signal which is subsequently rejected when tested in the general recognition logic GL. Any optoelectrical bar code reader or, more generally speaking, any optoelectrical character recognition system predicated on multiple line scanning must include lock-out means for precluding repetitions of valid characters, or strings of valid characters, which would occur in the absence of such lock-out means. Such lock-out means may take various forms, and the above disclosed two-channel circuitry embodying this invention may be provided with various lock-out means of the above description. One possible lock-out means is shown in FIG. 9 and will be described below.

Typically the optimal scan is the second scan after a line has been found, i.e. a predetermined number of successive valid characters detected within that scan. The term optical scan implies the best centering of the scanned line. The scan counter SC of FIG. 9 determines the scan number. Scan O may be referred-to as the line finding scan. The subsequent scan 1 may not be used since it is not an optimal scan within the above meaning. Scan 2 may be used for character output for the reasons set forth above. Scan 3 may be used to reset the line presence flip-flop LPFF as shown in FIG. 9 by the intermediary of NAND-gate ND and inverter IR. In order for the individual character recognition logic ICR to have an output it must be supplied with an enable signal. This signal is derived from scan counter SC and carried by line LIX to unit ICR.

All timing operations required by the system or reader which has been described above as, for instance, the determination of bar width, or the determination of character interval times, are based on a master clock (not shown), as is common in the art.

I claim as my invention:

1. An optical character reader comprising a. a linear array of photosensors;

b. a first channel including a first group of summing amplifiers carrying signals which are a combination formed by said first group of summing amplifiers of the outputs of a first portion of the constituent photosensors of said array;

c. a second channel including a second group of summing amplifiers carrying signals which are a combination formed by said second group of summing amplifiers of the outputs of a second portion of the constituent photosensor of said array;

d. a dual state change-over selector switch means having a first input derived from said first channel and having a second input derived from said second channel and having an output derived selectively from said first channel and from said second channel;

e. character recognition circuitry having an input formed by the output of said selector switch means;

f. a detector under the control of said character recognition circuitry for detecting a predetermined number of successive valid characters within a given scan;

g. additional recognition circuitry under the control of said detector for controlling the state of said change-over switch means in accordance with the truth table

| | $B$ | $\bar{B}$ |
|---|---|---|
| $A$ | O | X |
| $\bar{A}$ | X | X |

wherein X means that said selector switch means is in a state supplying said character recognition circuitry with the output of said first channel, O means that said selector switch means is in a state supplying said character recognition circuitry with the output of said second channel, $\bar{A}$ means the state wherein said detector has determined the presence of a predetermined number of successive valid characters within a given scan, A means not A, B means the state wherein said additional character recognition circuitry has determined the presence of a valid character in said second channel, and B means not $\bar{B}$.

2. An optical character reader as specified in claim 1 wherein a. said first channel includes a first delay line having an output forming an input of said change-over selector switch means;

b. said selector channel includes a second delay line having an output forming an input of said change-over selector switch means;

c. said character recognition circuitry includes bar geometry verification means, bar count verification means and character interval timing means whose input is the output of said change-over selector switch means;

d. said additional recognition circuitry includes bar geometry verification means, bar count verification means and character interval timing means supplied with undelayed signals from said first channel and from said second channel; and wherein e. said detector includes a valid character counter supplied with signals derived from said character interval timing means of said character recognition circuitry, and further includes a scan counter supplied with signals derived from photosensors of said array.

3. An optical character reader including a. a linear array of photosensors;

b. a first channel carrying signals which are a combination of the outpupt of a first portion of the constituent photosensors of said array;

c. a second channel carrying signals which are a combination of the output of a second portion of the constituent photosensors of said array;

d. said first channel including a first group of summing amplifiers, a first group of diodes rectifying the outputs of said first group of summing amplifiers, first quantizer means for quantizing the outputs of said first group of diodes and a first delay line arranged in series with said first quantizing means;

e. said second channel including a second group of summing amplifiers, a second group of diodes rectifying the outputs of said second group of summing amplifiers, second quantizer means for quantizing the outputs of said second group of diodes and a second delay line arranged in series with said second quantizing means;

f. a dual state change-over selector switch means having a first input derived from said first delay line of said first channel and a second input derived from said second delay line of said second channel and an output derived selectively from said first delay line and said second delay line;

g. a first logic circuitry connected to both said first channel and said second channel at points ahead of said first delay line and ahead of said second delay line for performing character recognition operations on undelayed signals;

h. a second logic circuitry having an input derived from the output of said change-over selector switch means for performing character recognition operations on delayed signals; and i. detector means responsive to an output of said second logic circuitry for detecting the presence of a predetermined number of successive valid characters within a given scan and for initiating operation of said first logic circuitry.

4. An optical character reader as specified in claim 3 wherein a. said first logic circuitry includes bar geometry verification means, bar count verification means and character interval timing means under the control of means for sensing black on a typed page;

b. said second logic circuitry includes bar geometry verification means, bar count verification means and an OR-gate for combining the outputs thereof, said second logic circuitry further including character interval timing means adapted to be re-set by the output of said OR gate; and wherein c. said detector means include a valid character counter supplied with signals derived from said character interval timing means of said second logic circuitry and further include a scan counter supplied with signals derived from photosensors of said array of photosensors.

5. An optical bar code reader including a. a linear array of photosensors;

b. a first channel carrying signals which are a combination of the output of a first portion of the constituent photosensors of said array;

c. a second channel carrying signals which are a combination of the output of a second portion of the constituent photosensors of said array;

d. a dual state change-over selector switch means having a first input derived from said first channel and a second input derived from said second channel, and having an output derived selectively from said first channel and from said second channel; and e. logic circuitry for controlling the state of said selector switch means, said logic circuitry including means for detecting in said first channel a predetermined number of valid bar characters within a predetermined time frame, and said logic circuitry further including a valid code set recognition means.

6. An optical bar code reader as specified in claim 5 wherein a. said first channel and said second channel each include groups of summing amplifiers, one group for combining the outputs of said first portion of said constituent photosensors of said array and the other group for combining the outputs of said second portion of said constitutent photosensors of said array;

b. said first channel includes first diode means for combining the outputs of said one group of summing amplifiers, and said second channel includes second diode means for combining the outputs of said other group of summing amplifiers, and wherein c. each said first channel and said second channel include a delay line.

7. A bar code reader as specified in claim 6 wherein a. said array of photosensors includes n photosensors having outputs $C_1,C_2,C_3 \ldots C_{n-2},C_{n-1}$, and $C_n$ in the order of the position thereof in said array;

b. n being an odd number;

c. said first channel includes a group of summing amplifiers summing the outputs $C_1$ to $C_{(n+3)/2}$ of said photosensors into $(n-3)/2$ terms $$C_2 + C_3 - (C_1 + C_4)$$

$$C_3 + C_4 - (C_2 + C_5)$$

$$\vdots$$

$$\frac{C_{n-1}}{2} + \frac{C_{n+1}}{2} - \frac{C_{n-3}}{2} + \frac{C_{n+3}}{2} ;$$

and wherein d. said second channel includes a group of summing amplifiers summing the outputs $C_{(n-1)/2}$ to $C_n$ of said photosensors into $(n-3)/2$ terms $$\frac{C_{n+1}}{2} + \frac{C_{n+3}}{2} - \frac{C_{n-1}}{2} + \frac{C_{n+5}}{2}$$

$$\frac{C_{n+3}}{2} + \frac{C_{n+5}}{2} - \frac{C_{n+1}}{2} + \frac{C_{n+7}}{2}$$

$$\vdots$$

$$C_{n-1} + C_{n-2} - (C_{n-3} + C_n).$$

8. An optical bar code reader as specified in claim 5 wherein said change-over selector switch includes an inverter and a pair of NAND-gates each having two inputs, one of the inputs of on said pair of NAND-gates forming part of said first channel and one of the inputs of the other of said pair of NAND-gates forming part of said second channel, and one of the inputs of one of said pair of NAND-gates being the output of said inverter.

* * * * *